United States Patent [19]

O'Donnell

[11] Patent Number: 5,462,177
[45] Date of Patent: Oct. 31, 1995

[54] COMPACT DISC STORAGE AND DISPLAY RACK

[76] Inventor: Michael J. O'Donnell, 6530 W. 109th St., Worth, Ill. 60482

[21] Appl. No.: 241,412

[22] Filed: May 11, 1994

[51] Int. Cl.[6] .................................................... A47F 7/00
[52] U.S. Cl. ................................ 211/40; 211/88; 211/89
[58] Field of Search ............................. 211/40, 41, 88, 211/71, 89, 94; 40/124, 124.4, 124.2; 312/9.9, 9.45, 9.46

[56] References Cited

U.S. PATENT DOCUMENTS

| | | | |
|---|---|---|---|
| 4,919,287 | 4/1990 | Haskett et al. | 211/41 |
| 4,940,147 | 7/1990 | Hunt | 211/40 |
| 4,951,826 | 8/1990 | Tompkins | 211/41 X |
| 5,040,687 | 8/1991 | Whittington | 211/40 |
| 5,232,089 | 8/1993 | Kim | 211/41 X |
| 5,351,835 | 10/1994 | Hallgren | 211/88 X |

Primary Examiner—Robert W. Gibson, Jr.

[57] ABSTRACT

Disclosed is a new compact disc (CD) storage and display rack for storing a collection of individually cased compact discs in a wall mountable rack which provides an attractive display of the CD case covers, protection of the CDs and CD cases from damage, easy organization of the collection, and convenient extraction/insertion of a CD from it's case without needing to remove the CD case from the rack. The compact disc storage and display rack comprises a rigid panel having a plurality of identical shallow cavities formed therein. Each cavity is adapted to releasably retain a conventional compact disc storage case. The plurality of cases lie in spaced coplanar relationship to each other. Each cavity has gripping pads whereby the CD case is gripped only by the bottom part, the top part of the case being freely pivotable about the hinge. Finger access slots provide clearance adjacent each CD case for insertion of a user's fingers to grasp the top part of the case for opening thereof.

2 Claims, 4 Drawing Sheets

COMPACT DISC STORAGE AND DISPLAY RACK

BACKGROUND OF THE INVENTION

1. Field of the Invention

The present invention relates to compact disc holders and more particularly pertains to a compact disc storage and display rack which may be adapted for storing a collection of individually cased compact discs in a wall mountable rack.

2. Description of the Prior Art

The use of compact disc holders is known in the prior art. More specifically, compact disc holders heretofore devised and utilized for the purpose of storing compact discs are known to consist basically of familiar, expected and obvious structural configurations, notwithstanding the myriad of designs encompassed by the crowded prior art which have been developed for the fulfillment of countless objectives and requirements.

The present invention is directed to improving devices for storing compact discs in a manner which is safe, secure, economical and aesthetically pleasing.

U.S. Pat. No. 5,048,680 to Fitzpatrick describes a compact disc case display holder and assembly which is similar to the present invention compact disc storage and display rack. The Fitzpatrick device has a disadvantage in that the CD case must be removed from the display holder for removal and insertion of the compact disc.

The prior art also discloses a media storage apparatus as shown in U.S. Pat. No. 4,714,157 to Morrone, a storage arrangement for optical discs and their containers of U.S. Pat. No. 4,823,950 to Roze, a case for multiple compact disks in U.S. Pat. No. 4,892,189 to Kunimune et al., and a snap action storage holder for computer diskettes of U.S. Pat. No. 4,928,828 to Cohen. While these devices fulfill their respective, particular objectives and requirements, the aforementioned patents do not disclose a compact disc storage and display rack for storing a collection of compact discs (CDs) in a wall mountable rack.

In this respect, the compact disc storage and display rack according to the present invention substantially departs from the conventional concepts and designs of the prior art, and in so doing provides an apparatus primarily developed for the purpose of storing a collection of individually cased compact discs in a wall mountable rack.

Therefore, it can be appreciated that there exists a continuing need for a new compact disc storage and display rack which can be used for storing a collection of individually cased compact discs in a wall mountable rack which provides an attractive display of the CD case covers, protection of the CDs and CD cases from damage, easy organization of the collection, and convenient extraction/insertion of a CD from it's case without needing to remove the CD case from the rack. In this regard, the present invention substantially fulfills this need.

As illustrated by the background art, efforts are continuously being made in an attempt to develop devices for storing compact discs. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of compact disc holders now present in the prior art, the present invention provides a new compact disc holder construction wherein the same can be utilized for storing a collection of individually cased compact discs in a wall mountable rack which provides an attractive display of the CD case covers, protection of the CDs and CD cases from damage, easy organization of the collection, and convenient extraction/insertion of a CD from it's case without needing to remove the CD case from the rack. As such, the general purpose of the present invention, which will be described subsequently in greater detail, is to provide a new compact disc storage and display rack apparatus and method, which has all the advantages of the prior art compact disc holders and none of the disadvantages.

The invention is defined by the appended claims with the specific embodiment shown in the attached drawings. For the purpose of summarizing the invention, the invention may be incorporated into a new compact disc (CD) storage and display rack for storing a collection of individually cased compact discs in a wall mountable rack which provides an attractive display of the CD case covers, protection of the CDs and CD cases from damage, easy organization of the collection, and convenient extraction/insertion of a CD from it's case without needing to remove the CD case from the rack.

The compact disc storage and display rack comprises a rigid panel having a plurality of identical shallow rectangular straight-walled cavities formed therein. Each cavity is adapted to releasably retain a conventional compact disc storage case having a top part and a bottom part hingedly connected together at the edges. The plurality of cases lie in spaced coplanar relationship to each other. Each cavity has gripping means whereby the CD case is gripped only by the bottom part, the top part of the case being freely pivotable about the hinge.

Finger access means provides clearance adjacent each CD case for insertion of a user's fingers to grasp the top part of the case for opening thereof.

Mounting means is also included whereby the panel may be attached to a room wall such that the panel lies flat against the wall with the cavities opening outwardly.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new compact disc storage and display rack for storing a collection of compact discs (CDs) in a wall mountable rack.

It is another object of the present invention to provide a new compact disc storage and display rack which may be easily and efficiently manufactured and marketed.

It is a further object of the present invention to provide a new compact disc storage and display rack which is of a durable and reliable construction.

An even further object of the present invention is to provide a new compact disc storage and display rack which is susceptible of a low cost of manufacture with regard to both materials and labor, and which accordingly is then susceptible of low prices of sale to the consuming public, thereby making such compact disc storage and display racks economically available to the buying public.

Still yet another object of the present invention is to provide a new compact disc storage and display rack which provides in the apparatuses and methods of the prior art some of the advantages thereof, while simultaneously overcoming some of the disadvantages normally associated therewith.

Still yet another object of the present invention is to provide a new compact disc storage and display rack which provides an attractive display of the CD case covers and protects the CDs and CD cases from damage.

Yet another object of the present invention is to provide a new compact disc storage and display rack which makes it easy to organize the collection of CDs.

Even still another object of the present invention is to provide a new compact disc storage and display rack which allows convenient extraction/insertion of a CD from it's case without removing the CD case from the rack.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
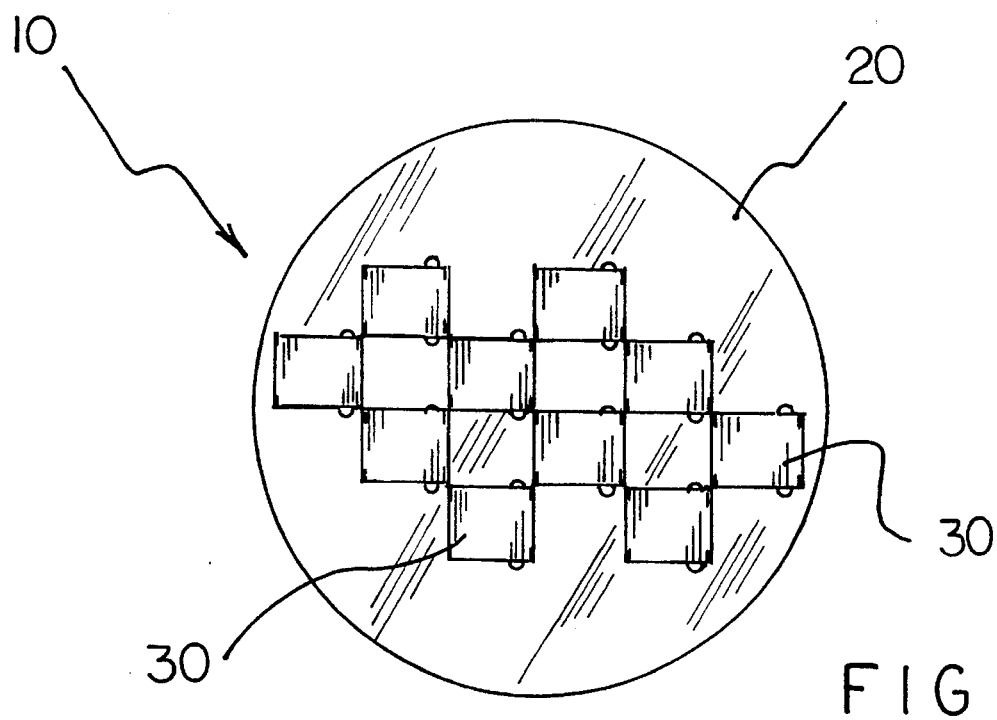
FIG. 1 is a front elevational view of the preferred embodiment of the compact disc storage and display rack.

With reference now to the drawings, and in particular to FIG. 1 thereof, a new compact disc storage and display rack embodying the principles and concepts of the present invention and generally designated by the reference numeral 10 will be described.

From an overview standpoint, the compact disc storage and display rack is adapted for use for storing a collection of compact discs (CDs) in a wall mountable rack which provides an attractive display of the CD case covers, protection of the CDs and CD cases from damage, easy organization, and convenient extraction/insertion of a CD from it's case without removing the CD case from the rack. See FIG. 1.

Figure 5:
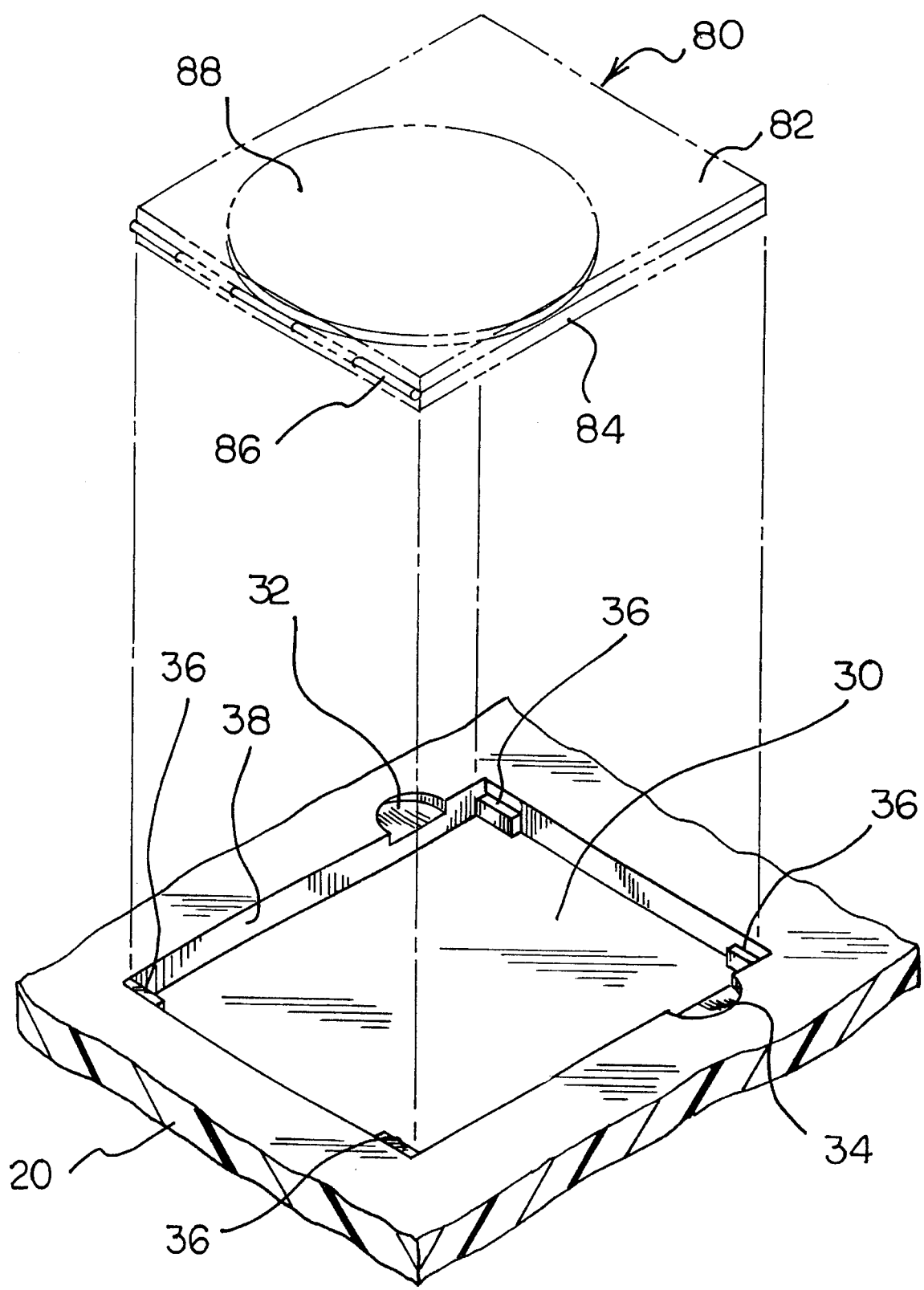
FIG. 5 is a front perspective view of the CD case retaining cavity showing its manner of use with a CD case.

With reference now to FIGS. 1 and 5 and more specifically, it will be noted that a new compact disc (CD) storage and display rack 10 is shown.

The compact disc storage and display rack 10 comprises a round rigid panel 20 having a plurality of identical shallow straight-walled rectangular cavities 30 formed therein. Each cavity 30 is adapted to releasably retain a conventional compact disc storage case 80 having a top part 82 and a bottom part 84 connected together at the edges with a hinge 86. The plurality of cases 80 lie in spaced coplanar relationship to each other. Each cavity 30 has gripping means whereby the CD case 80 is gripped only by the bottom part 84, the top part 82 of the case being freely pivotable about the hinge 86. The gripping means comprises a resilient pad 36 fixedly attached to the cavity wall 38 proximal each corner thereof. The pads 36 have a thickness such that the pads are compressed when the CD case 80 is inserted into the cavity 30. The exposed surface of the pads has a high coefficient of friction to frictionally engage the bottom part 84 of the CD case such that, in combination with the pad's resiliency, the bottom part 84 of the CD case is releasably gripped.

Finger access means provides clearance adjacent each CD case 80 for insertion of a user's fingers to grasp the top part 82 of the case for opening thereof. The finger access means comprises first and second shallow semicircular cavities 32 and 34 formed in the panel 20, each semicircular cavity 32 and 34 being in communicating relationship with the rectangular cavity 30. The semicircular cavities 32 and 34 extend outwardly from opposing long edges of the rectangular cavity 30 proximal one end thereof, the semicircular cavities 32 and 34 also being situated opposite each other whereby defining a pair of finger clearance slots.

Mounting means is also included whereby the panel 20 may be attached to a room wall such that the panel lies flat against the wall with the cavities 30 opening outwardly.

Figure 3:
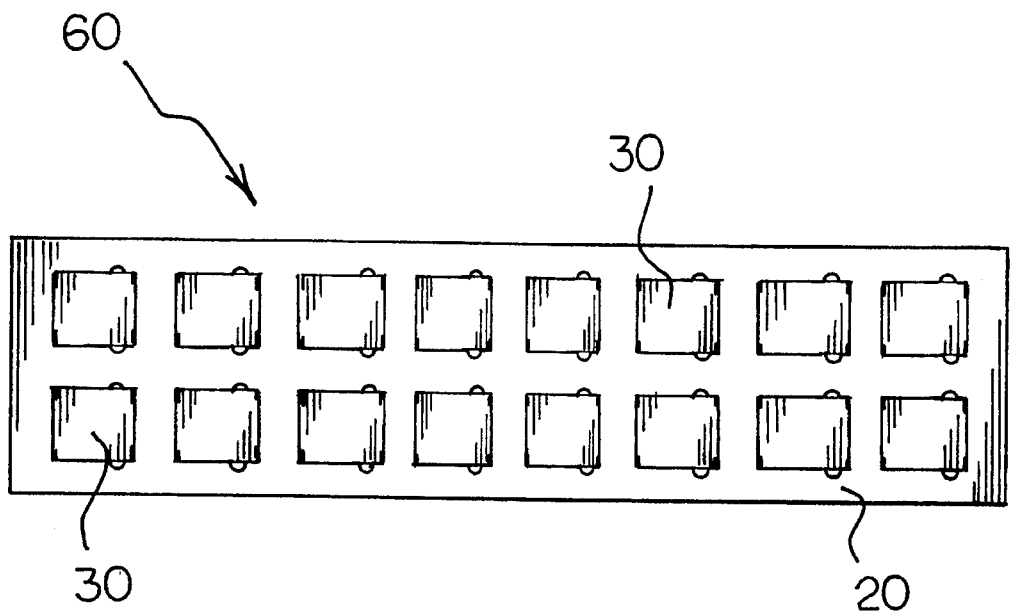
FIG. 3 is a front elevational view of another alternate embodiment of the present invention.
Figure 4:
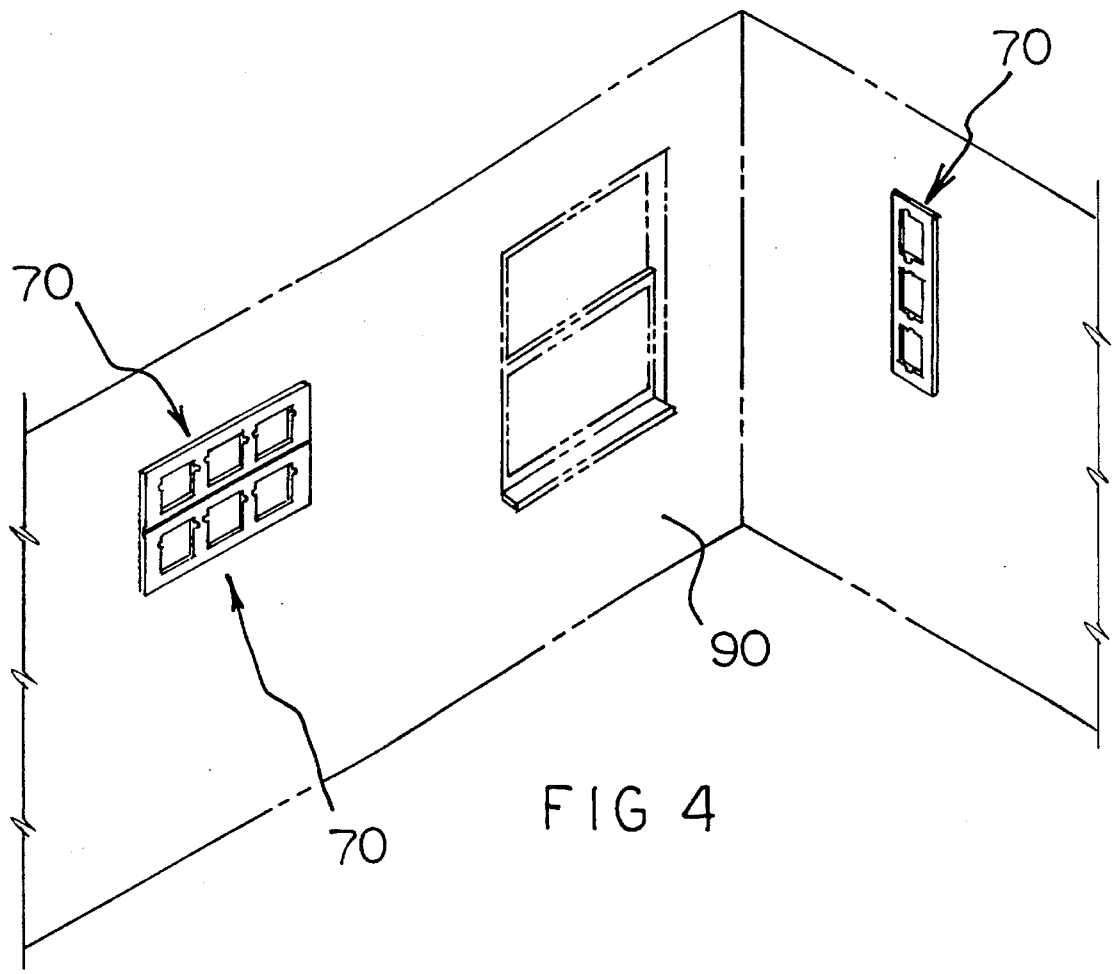
FIG. 4 is a perspective view of an embodiment of the compact disc storage and display rack showing it mounted on room walls.
Figure 6:
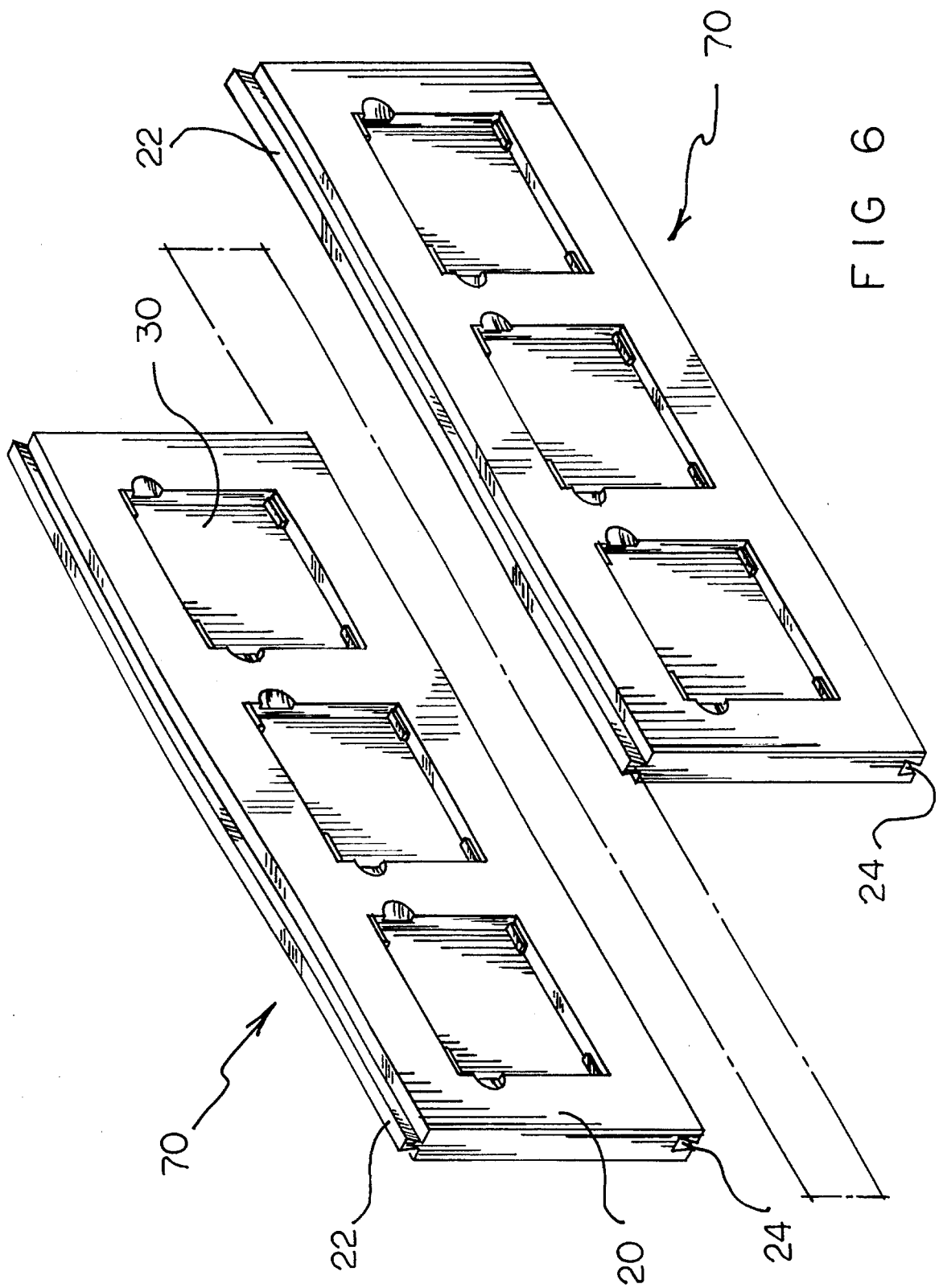
FIG. 6 is a front elevational view of yet another embodiment of the present invention illustrating a way to connect racks together.

FIG. 3 shows an alternate embodiment of the compact disc storage and display rack, generally designated by the reference numeral 60, wherein the panel 20 is rectangular in shape. FIG. 6 illustrates another embodiment of the rack 70 which further includes connecting means for removably connecting together a plurality of racks. The connecting means comprising a dovetail tongue 22 formed along a top edge of the panel 20 and a dovetail groove 24 formed along a bottom edge of the panel 20. The tongue 22 of one panel may slidably engage the groove 24 of another panel such that the panels are joined coplanarly forming a single functional unit. FIG. 4 depicts a typical installation of three compact disc storage and display racks 70 mounted to a room wall 90.

Figure 2:
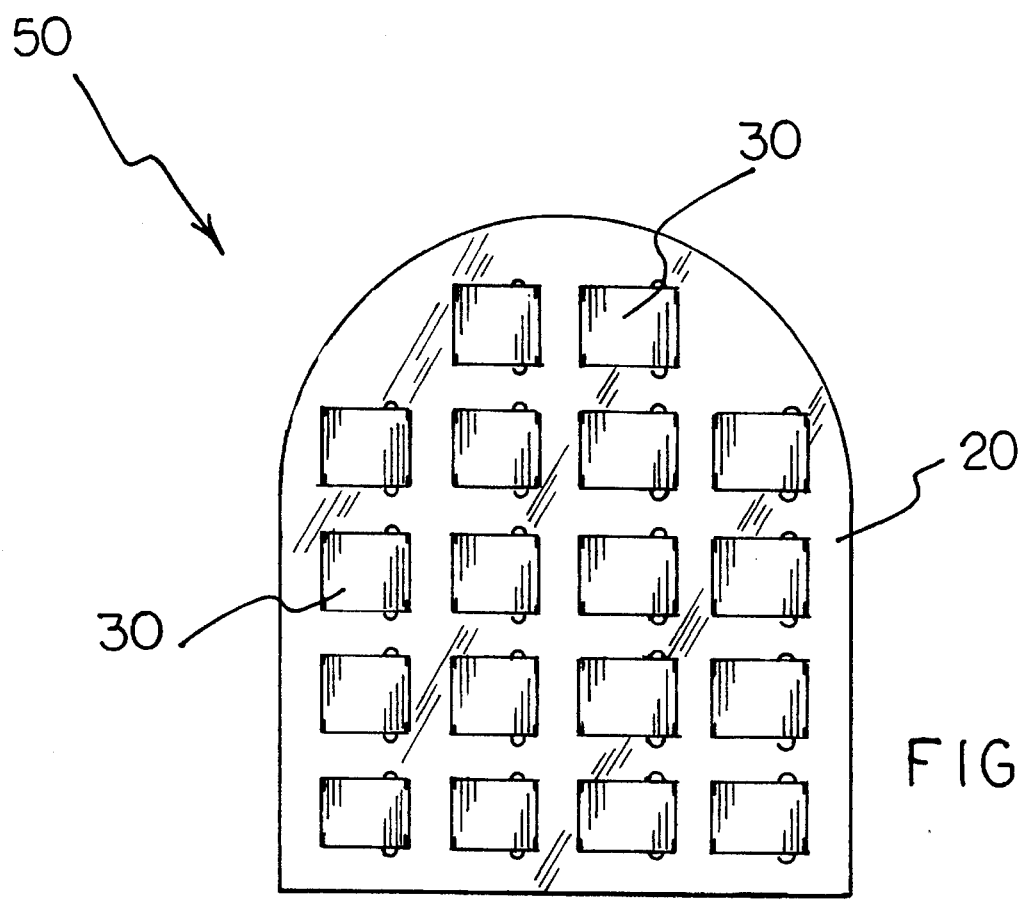
FIG. 2 is a front elevational view of an alternate embodiment of the present invention.

FIG. 2 shows another embodiment of the compact disc storage and display rack 50 wherein the panel 20 is arch-shaped.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A new compact disc (CD) storage and display rack for storing a collection of individually cased compact discs in a wall mountable rack which provides an attractive display of the CD case covers, protection of the CDs and CD cases from damage, easy organization of the collection, and convenient extraction/insertion of a CD from it's case without needing to remove the CD case from the rack, the compact disc storage and display rack comprising:

a rectangular rigid panel having a plurality of identical shallow straight-walled rectangular cavities formed therein, each cavity being adapted to releasably retain a conventional compact disc storage case having a top part and a bottom part hingedly connected together at the edges such that the plurality of Cases lie in a spaced coplanar relationship to each other, each cavity having gripping means whereby the CD case is gripped only by the bottom part, the top part of the case being freely pivotable about the hinge;

finger access means for providing clearance adjacent each CO case for insertion of a user's fingers to grasp the top part of the case for opening thereof, wherein the finger access means comprises first and second shallow semicircular cavities formed in the panel, each semicircular cavity being in communicating relationship with the rectangular cavity, the semicircular cavities extending outwardly from opposing long edges of the rectangular cavity proximal on end thereof, the semicircular cavities also being situated opposite each other whereby defining a pair of finger clearance slots;

mounting means whereby the panel my be attached to a room wall such that the panel lies flat against the wall with the cavities opening outwardly;

connecting means for removably connecting together a plurality of racks, the connecting means comprising a dovetail tongue formed along a top edge of the panel and a dovetail groove formed along a bottom edge of the panel whereby the tongue of one panel may slidably engage the groove of another panel such that the panels are joined coplanarly forming a single functional unit.

2. The compact disc storage and display rack of claim 1 wherein the gripping means comprises a resilient pad fixedly attached to the cavity wall proximal each corner thereof, the pads having a thickness such that the pads are compressed when the CD case is inserted into the cavity, the exposed surface of the pads having a high coefficient of friction to fictionally engage the bottom part of the CD case such that, in combination with the pad resiliency, the CD bottom part of the CD case is releasably gripped.

* * * * *